United States Patent
Shen

(10) Patent No.: US 8,199,666 B2
(45) Date of Patent: Jun. 12, 2012

(54) TRANSMISSION OF ACKNOWLEDGE/NOT-ACKNOWLEDGE WITH REPETITION

(75) Inventor: Zukang Shen, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 12/698,671

(22) Filed: Feb. 2, 2010

(65) Prior Publication Data

US 2010/0260120 A1 Oct. 14, 2010

Related U.S. Application Data

(60) Provisional application No. 61/149,236, filed on Feb. 2, 2009.

(51) Int. Cl.
*H04W 4/00* (2009.01)
(52) U.S. Cl. ........... 370/252; 370/329; 455/69; 714/748
(58) Field of Classification Search .......... 370/328–338, 370/341, 437, 458; 455/69; 714/746–750
See application file for complete search history.

(56) References Cited

U.S. PATENT DOCUMENTS

| 2006/0035594 A1* | 2/2006 | Murata et al. ............ 455/67.13 |
| 2008/0165697 A1* | 7/2008 | Zeira et al. ................... 370/252 |
| 2010/0097978 A1* | 4/2010 | Palanki et al. ............... 370/315 |
| 2010/0153804 A1* | 6/2010 | Cai et al. ..................... 714/748 |
| 2011/0206018 A1* | 8/2011 | Li et al. ....................... 370/336 |
| 2011/0305182 A1* | 12/2011 | Suzuki et al. ............... 370/311 |

* cited by examiner

*Primary Examiner* — Steven H Nguyen
*Assistant Examiner* — Tung Q Tran
(74) *Attorney, Agent, or Firm* — Robert D. Marshall, Jr.; Wade james Brady, III; Frederick J. Telecky, Jr.

(57) ABSTRACT

In ACK/NAK responses with repetition, the ACK/NAK response from the user equipment to a Physical Downlink Shared CHannel (PDSCH) transmission is repeated in consecutive frames a predetermined number of frames following receipt. This repeat ACK/NAK causes a problem when a PSCCH transmission directed to the same user equipment occurs in consecutive subframes. In a first embodiment, the first ACK/NAK response repeats preempting any ACK/NAK response to the later PDSCH transmission. In a second embodiment, the first ACK/NAK response does not repeat and the ACK/NAK response to the later PDSCH transmission occurs.

4 Claims, 2 Drawing Sheets

TRANSMISSION OF ACKNOWLEDGE/NOT-ACKNOWLEDGE WITH REPETITION

CLAIM OF PRIORITY

This application claims priority under 35 U.S.C. 119(e)(1) to U.S. Provisional Application No. 61/149,236 filed Feb. 2, 2009.

TECHNICAL FIELD OF THE INVENTION

The technical field of this invention is wireless telephony.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

In ACK/NAK responses with repetition, the ACK/NAK response from the user equipment to a Physical Downlink Shared CHannel (PDSCH) transmission is repeated in consecutive frames a predetermined number of frames following receipt. This repeat ACK/NAK causes a problem when a PSCCH transmission directed to the same user equipment occurs in consecutive subframes. In a first embodiment, the first ACK/NAK response repeats preempting any ACK/NAK response to the later PDSCH transmission. In a second embodiment, the first ACK/NAK response does not repeat and the ACK/NAK response to the later PDSCH transmission occurs.

BRIEF DESCRIPTION OF THE DRAWINGS

These and other aspects of this invention are illustrated in the drawings, in which.

DETAILED DESCRIPTION OF PREFERRED EMBODIMENTS

The current specification in Evolved Universal Terrestrial Radio Access Network (E-UTRAN) ver. 8 on ACK/NAK repetition indicates that for Frequency Division Duplex (FDD), the UE shall upon detection of a Physical Downlink Shared CHannel (PDSCH) transmission in down link (DL) subframe n−4 intended for that UE for which an ACK/NACK is required, shall transmit the ACK/NACK response in up link (UL) subframe n. If ACK/NACK repetition is enabled, upon detection of a PDSCH transmission in subframe n−4 intended for the UE for which ACK/NACK response is require, and if the UE is not repeating the transmission of any ACK/NACK in subframe n corresponding to a PDSCH transmission in subframes $n-N_{ANRep}-3, \ldots, n-5$ the UE shall transmit only the ACK/NACK response corresponding to the detected PDSCH transmission in subframe n−4 on PUCCH in subframes n, n+1, ..., $n+N_{ANRep}-1$. The UE shall not transmit any other signal including any ACK/NACK response corresponding to any detected PDSCH transmission in subframes $n-N_{ANRep}-3, \ldots, n-5$.

Figure 1:
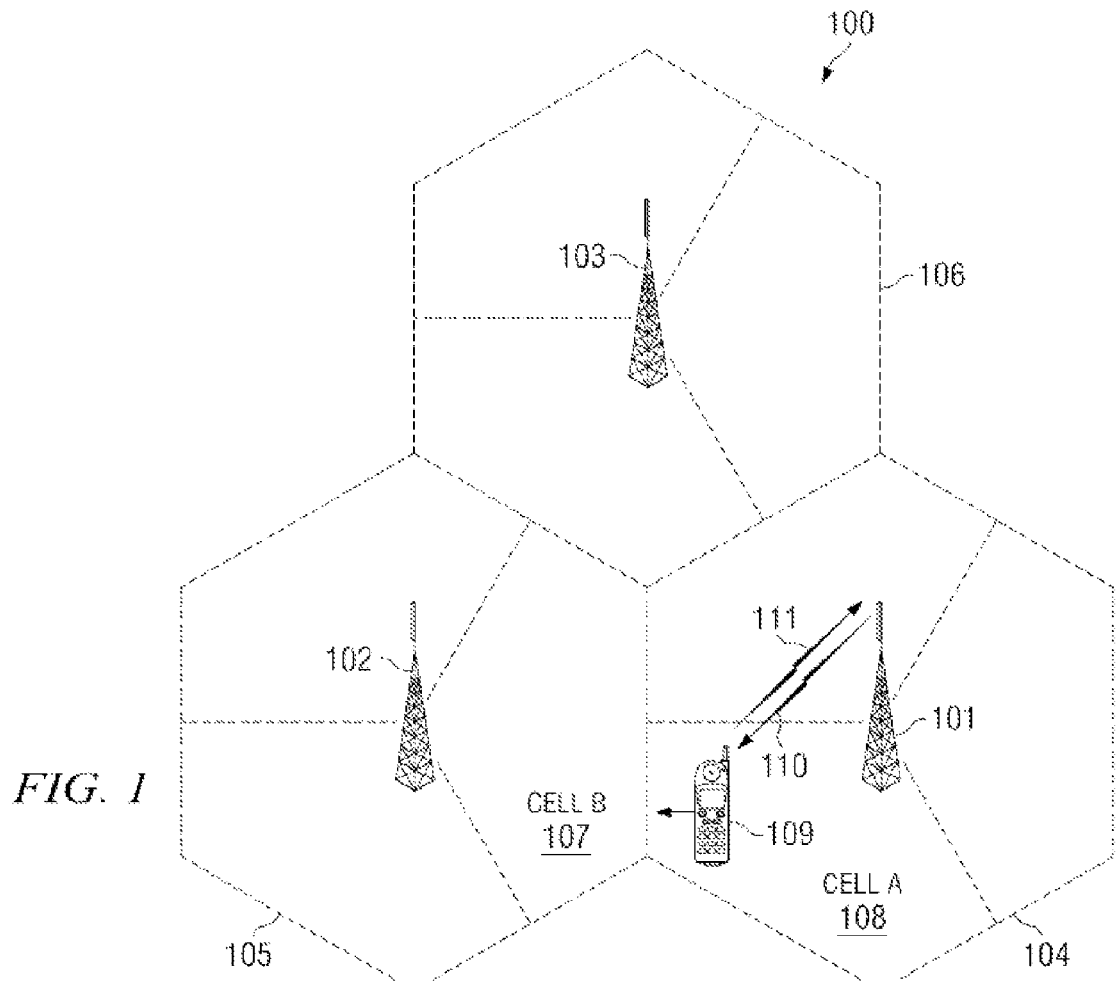
FIG. 1 is a diagram of a communication system of the prior art related to this invention having three cells.
Figure 2:
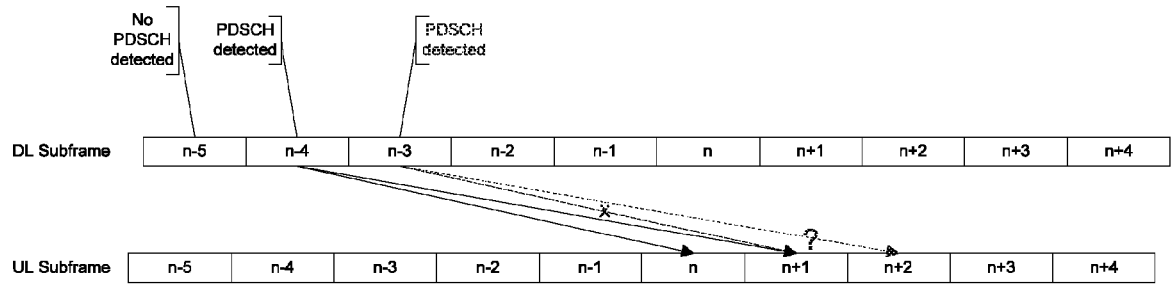
FIG. 2 is an example of ACK/NAK repetition with repetition factor of 2 of the prior art.

FIG. 2 illustrates an example of operation according to this requirement. If no PDSCH is detected in subframe n−5 and there is PDSCH detected in subframe n−4, then the UE transmits the ACK/NAK corresponding to the PDSCH detected in subframe n−4 in subframes n and n+1. If there is PDSCH detected in subframe n−3, then the initial ACK/NAK transmission in subframe n+1 is dropped. The standard does not specify whether the repeated transmission of the ACK/NAK corresponding to the PDSCH in subframe n−3 shall be dropped in subframe n+2.

There are three options to resolve this ambiguity. The first option keep the specification as it is. This option potentially leads to uncertain UE behavior, regarding the ACK/NAK transmission in subframe n+2 corresponding to the PDSCH received in subframe n−3 as illustrated in FIG. 2.

Figure 3:
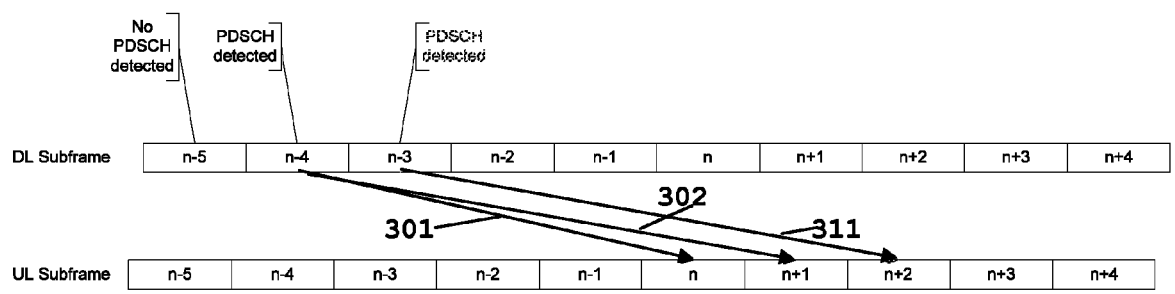
FIG. 3 is an example of ACK/NAK repetition with repetition factor of 2 of the first embodiment of the present invention.

FIG. 3 illustrates the second option. In the second option the UE transmits the ACK/NAK in subframe n+2 corresponding to the PDSCH received in subframe n−3 as transmission 301. Transmission 302 is the repeat of this ACK/NAK in UL subframe n+2. In this second option, if a UE is scheduled for PDSCH transmission in a consecutive number of DL subframes, then for any PDSCH other than the first the ACK/NAK repetition is effectively disabled. Thus there is no ACK/NAK response to the PDSCH transmitted in DL subframe n−1 in UL subframe n+2. The repeat count of 2 permits an ACK/NAK transmission 311 to the PDSCH received in DL subframe n−3 in UL subframe n+2.

Figure 4:
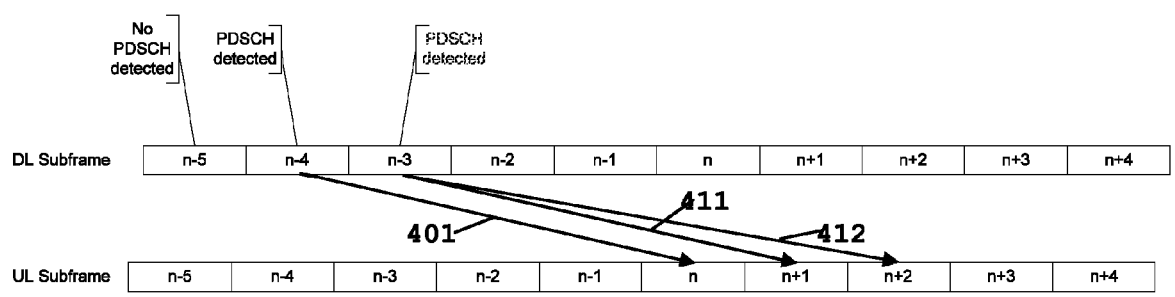
FIG. 4 is an example of ACK/NAK repetition with repetition factor of 2 of the second embodiment of the present invention.

FIG. 4 illustrates the third option. In the third option the UE transmits the ACK/NAK in subframe n+2 corresponding to the PDSCH received in subframe n−3 as transmission 401. The UE does not transmit the ACK/NAK in subframe n+2 corresponding to the PDSCH received in subframe n−3. In this third option, the ACK/NAK for some PDSCH cannot be transmitted even if such transmission is feasible. Instead transmission 411 of the ACK/NAK response to the PDSCH received in DL subframe n−3 occurs during UL subframe n+1. Transmission 412 is the repeat of this ACK/NAK occurring in UL subframe n+2.

What is claimed is:

1. A method of transmission acknowledge/not acknowledge (ACK/NAK) with repetition in a user equipment comprising the steps of:
    determining if a Physical Downlink Shared CHannel (PDSCH) transmission directed to a particular user equipment is received in a subframe without receiving a PDSCH transmission directed to the particular user equipment in a next following subframe;
    transmitting an ACK/NAK response to the PDSCH transmission in a second subframe a predetermined number of subframes following the PDSCH transmission and in a repeat number of immediately following subframes;
    determining if a PDSCH transmission directed to the particular user equipment is received in two consecutive subframes;
    transmitting a first ACK/NAK response to a first of the PDSCH transmissions of the first of the two consecutive subframes in a fourth subframe the predetermined number of subframes following the first PDSCH transmission received in a first of the two consecutive subframes; and
    transmitting a second ACK/NAK response to a second of the PDSCH transmissions of the second of the two consecutive subframes in a fifth subframe immediately following the fourth subframe and not transmitting a repeat of the first ACK/NAK response in the fifth subframe.

2. The method of claim 1, wherein:
    the predetermined number of subframes is four.

3. A method of transmission acknowledge/not acknowledge (ACK/NAK) with repetition in a user equipment comprising the steps of:
    determining if a Physical Downlink Shared CHannel (PDSCH) transmission directed to a particular user equipment is received in a subframe without receiving a PDSCH transmission directed to the particular user equipment in a next following subframe;
    transmitting an ACK/NAK response to the PDSCH transmission in a second subframe a predetermined number of subframes following the PDSCH transmission and in a repeat number of immediately following subframes;
    determining if Physical Downlink Shared CHannel (PDSCH) transmission directed to a particular user equipment is received in two consecutive subframes;
    transmitting a first ACK/NAK response to a first of the PDSCH transmissions of the first of the two consecutive subframes in a fourth subframe the predetermined number of subframes following the first PDSCH transmission of the first of the two consecutive subframes; and
    transmitting a repeat of the first ACK/NAK response to the first of the PDSCH transmissions of the first of the two consecutive subframes in a fifth subframe immediately following the fourth subframe and not transmitting a second ACK/NAK response to the second of the PDSCH transmissions of the second of the two consecutive subframes in the fifth subframe.

4. The method of claim 3, wherein:
    the predetermined number of subframes is four.

* * * * *